United States Patent [19]
Fleck et al.

[11] Patent Number: 6,128,641
[45] Date of Patent: Oct. 3, 2000

[54] DATA PROCESSING UNIT WITH HARDWARE ASSISTED CONTEXT SWITCHING CAPABILITY

[75] Inventors: Rod G. Fleck, Mountain View; Roger D. Arnold, Sunnyvale; Bruce Holmer, Belmont; Vojin G. Oklobdzija, Berkeley; Eric Chesters, Mountain View, all of Calif.

[73] Assignee: Siemens Aktiengesellschaft, Munich, Germany

[21] Appl. No.: 08/928,252

[22] Filed: Sep. 12, 1997

[51] Int. Cl.$^7$ ........................................................ G06F 9/00
[52] U.S. Cl. ............................................................ 709/108
[58] Field of Search ..................................... 709/100, 102, 709/104, 108

[56] References Cited

U.S. PATENT DOCUMENTS

| | | | |
|---|---|---|---|
| 4,025,904 | 5/1977 | Adney et al. . | |
| 4,074,353 | 2/1978 | Woods et al. . | |
| 5,008,812 | 4/1991 | Bhandarkar et al. | 712/228 |
| 5,142,677 | 8/1992 | Ehlig et al. | 709/108 |
| 5,201,039 | 4/1993 | Sakamura . | |
| 5,550,993 | 8/1996 | Ehlig et al. . | |
| 5,655,132 | 8/1997 | Watson | 709/104 |

FOREIGN PATENT DOCUMENTS 2 216 307  10/1989  United Kingdom .

*Primary Examiner*—Majid A. Banankhah

[57] ABSTRACT

The present invention relates to a method of context switching from a first task to a second task in a data processing unit having a register file with a plurality of general purpose registers and a context switch register, a memory comprising a previous context save area and an unused context save area. The memory is coupled with the register file and an instruction control unit with a program counter register and a program status word register coupled with the memory and the register file. The method comprises the steps of acquiring a new save area from said unused save area, storing the context of the first task in said new area, linking the new area with said previous context save area.

24 Claims, 3 Drawing Sheets

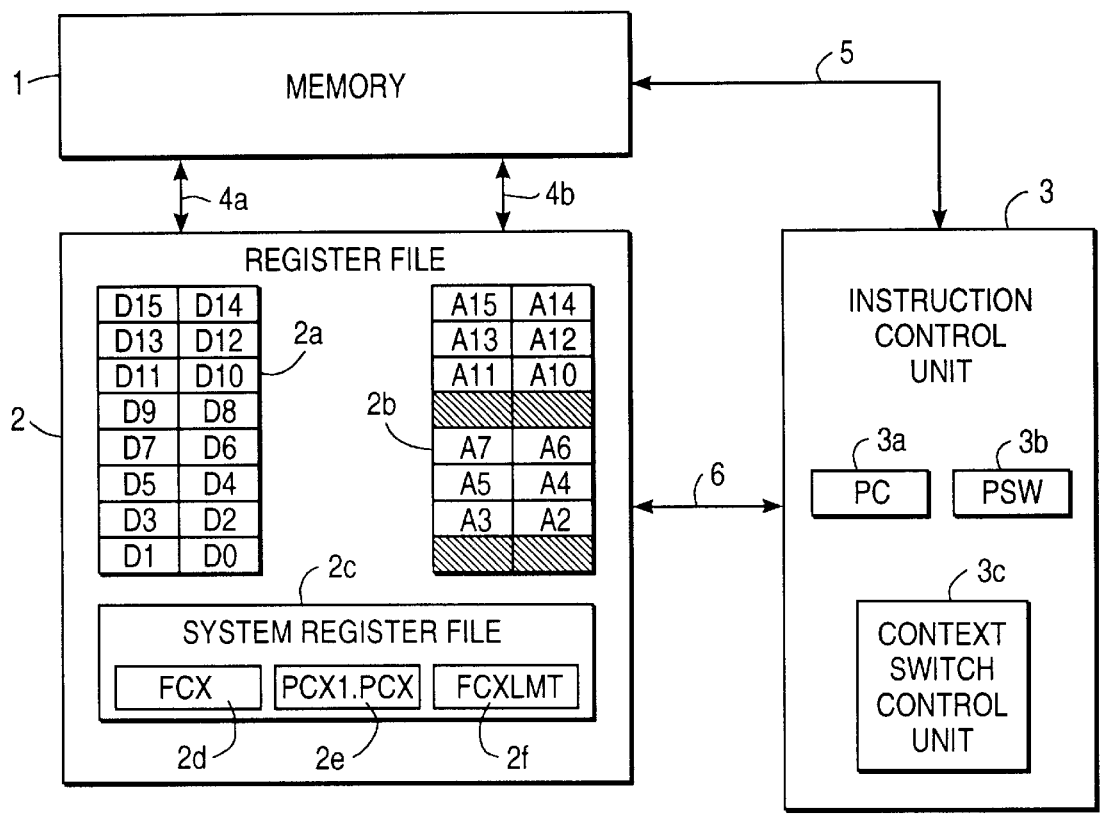
FIG_1
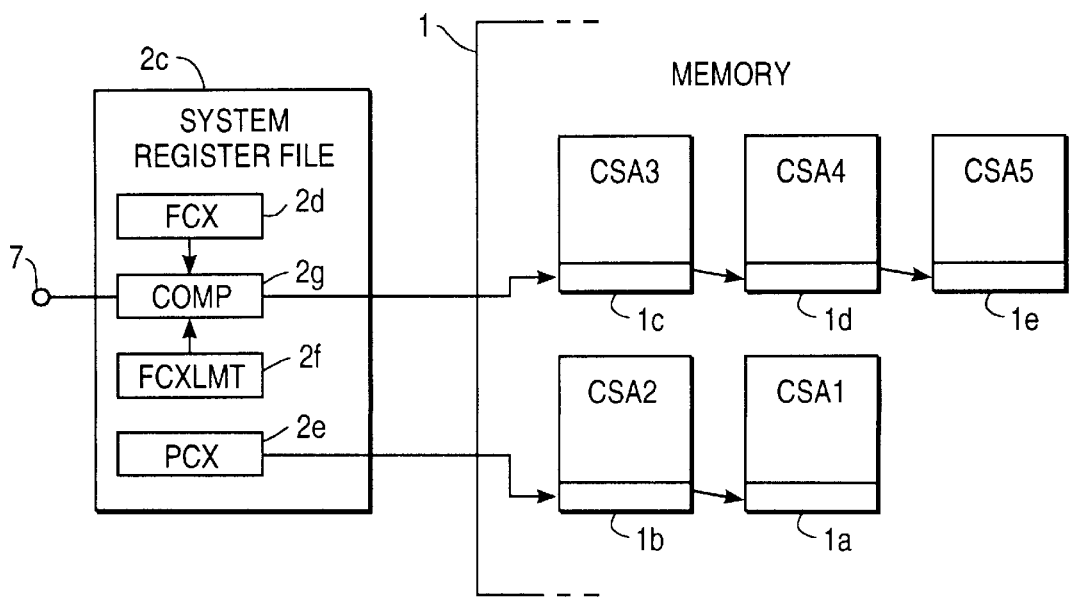
FIG_2

FIG_3
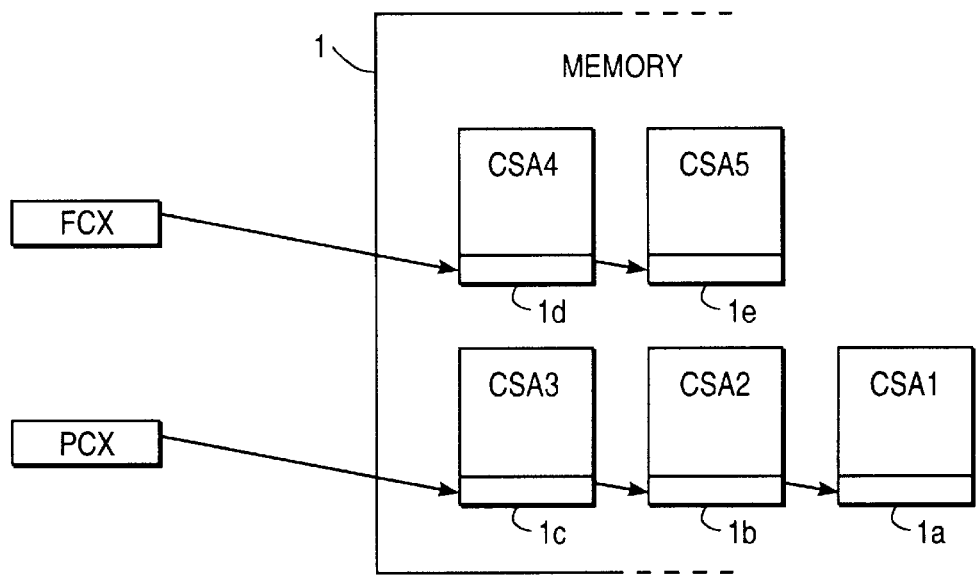
FIG_4
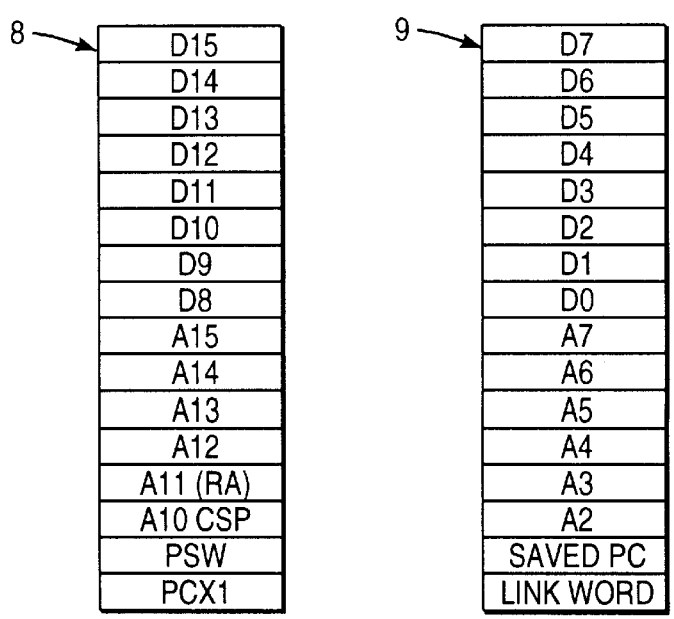
FIG_5

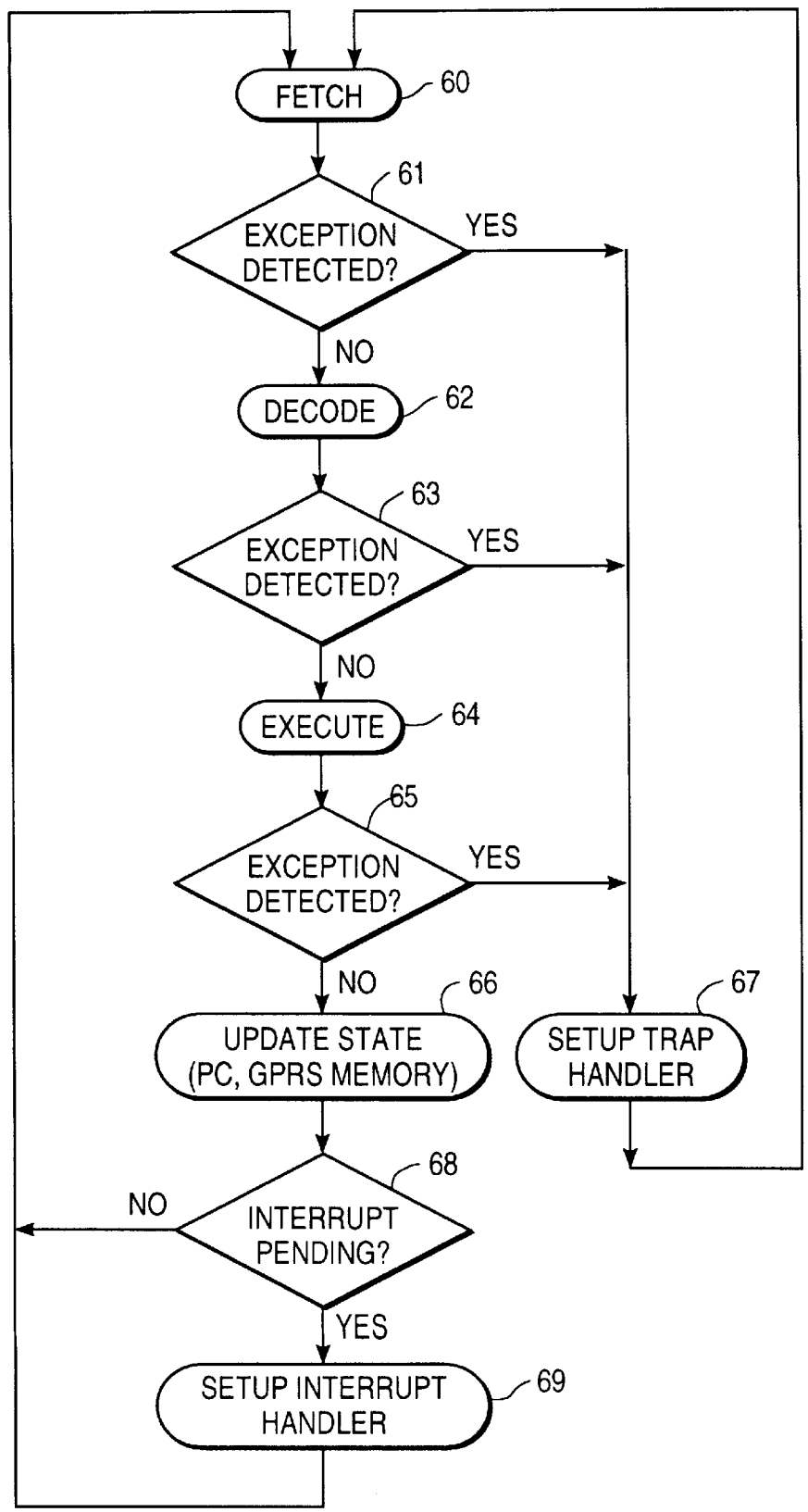
FIG_6

DATA PROCESSING UNIT WITH HARDWARE ASSISTED CONTEXT SWITCHING CAPABILITY

BACKGROUND OF THE INVENTION

The present invention relates to a data processing unit with hardware assisted context switching capabilities. Most embedded and real time control systems are designed according to a model in which interrupt handlers and software managed tasks are each considered to be executing on their own virtual microcontroller. That model is generally supported by the services of a real time executive or operating system, layered on top of the features and capabilities of the underlying machine architecture. A virtual microcontroller can be seen as a task having its own general purpose registers and associated special function registers like program counter, program status word, etc., which represent the task's context. Handling of these virtual microcontrollers in most of the known systems is done by means of software which saves and restores the respective context. Therefore, software for such a data processing unit needs an increased amount of memory and execution overhead for the context switching operation reduces the processing bandwidth available to application tasks.

SUMMARY OF THE INVENTION

It is an object of the present invention to provide a method and a data processing unit with the capability of fast hardware-assisted context switching, resulting in both decreased need for memory space and reduced execution overhead for context switching operations. This object is achieved by using a linked list mechanism to link save areas in a memory wherein each save area stores at least part of a context of a respective task.

It is a further object of the present invention to provide a hardware-assisted context switching. This is achieved by designing the hardware to be usable for both the full context switching that occurs when switching between tasks, and the limited context switching that occurs when calling a software function or returning from a function to its caller. It therefore serves to reduce memory space and execution overhead for both task switching and for function calls and returns.

A data processing unit comprises a register file with a plurality of general purpose registers and special purpose registers that enable the hardware to manage context switch operations. The data processing unit comprises a memory having an actual context save area and an unused context save area coupled with the register file. Furthermore, an instruction control unit with a program counter register and a program status register is coupled with the memory and the register file. Each context save area includes a word containing information that serves to link that save area to the next save area in a chain of linked save areas. Free save areas (those not currently holding context information for a "live" task or function) are linked together in one chain. Saved contexts resulting from a sequence of calls, traps, or interrupts are linked together in another chain, termed the previous context list. The current context resides in the general purpose and program state registers of the processor. To save the current context and create a new one, the following steps can be performed by the processor hardware:

a context save area is taken from the free list,
the current context is stored into the save area,
the save area is added to the head of the previous context list, The above steps are performed in connection with a function call, or with taking a trap or interrupt. They leave the called function or interrupt or trap handler free to modify the general registers and other processor state without destroying the context of the calling function or interrupted task.

To exit a called function or trap or interrupt handler and switch back to the previous context, the following steps are performed by the processor hardware:

the save area at the head of the previous context list is removed from that list,
the current context is loaded from the save area just removed from the previous context list,
the save area is added to the free context save area list.

The above steps are performed automatically as part of the function return instruction, or the instruction to return from an interrupt or trap handler.

To save the context of the current task and switch to another task, the above context save and restore operations are used together, as follows:

a system call instruction is issued, requesting a task switch,
the system call trap causes the current context to be saved, as described previously,
the trap handler for the system call trap changes the value of the processor register that points to the head of the previous context list, causing it to point to the save area for the task to which execution is being switched,
the trap handler exits, causing the context for the new task to be loaded and execution of that task to resume.

In a refinement of the method that does not alter the basic invention, the processor context is partitioned into two parts, the upper context, and the lower context. The two parts can be saved and restored separately. The initial context save operation that is performed on a function call, interrupt, or trap saves only the upper context. By software convention, a function that issues a call expects its upper context to be preserved across the call, but does not expect its lower context to be preserved. The called function therefore never needs to incur the cost of saving the lower context. A trap or interrupt handler that does not modify any of the register values in the lower context can also avoid the cost of saving the lower context.

BRIEF DESCRIPTION OF THE DRAWINGS

FIG. 1 shows the relevant parts of a data processing unit for path switching according to the present invention;

FIG. 2 shows a diagram containing the organization of the context save areas in the memory and the associated system registers, FIG. 3 shows a scheme changing the contents of the context switch registers with a task switch, FIG. 4 shows the organization of the context save areas in a memory after a context switch according to FIG. 2, FIG. 5 shows upper and lower context of a data processing unit according to the present invention, and FIG. 6 shows a flowchart of a sequential execution model.

DESCRIPTION OF THE PREFERRED EMBODIMENTS

The data processing unit according to the present invention provides the ability to create a real time executive or operating system which can be very "thin". Much of the work of switching between one task and another is handled efficiently by the hardware itself. Throughout this description, the term task is used in a general sense to refer to an independent thread of control, having its own context that defines the state of the virtual processor on which it executes. There are two types of tasks that is useful to distinguish: software managed tasks (SMT) and interrupt service routines (ISR). Software managed tasks are created through services of a real time kernel or operating system, and dispatched under control of scheduling software. Interrupt service routines are dispatched by the hardware, in response to an interrupt. In some systems, the main function of an ISR is simply to queue a software managed task and jump to the task scheduler. In those systems, it is actually a software managed task that, from a functional point of view, is responding to the interrupt event. Software managed tasks are sometimes referred to elsewhere as user tasks. That reflects an assumption that they will execute in user mode, whereas ISR are expected to execute in supervisor mode. In embedded systems, however, SMTs often run in supervisor mode, for efficient access to system resources.

FIG. 1 shows a block diagram of relevant parts for task switching in a data processing unit. A memory 1 is coupled with a register file through D buses 4a and 4b. The register file contains a first group of data registers 2a and a second group of address registers 2b which constitute the general purpose registers. A second set of registers 2c form the system registers wherein FIG. 1 shows only three of these registers which are necessary for context switching. The three registers are the FCX register 2b, the PCXI, the PCX-register 2e, and the FCXLMT-register 2f. The system registers can be part of the register file or be located elsewhere in the core of a microprocessor. Furthermore, FIG. 1 shows a instruction control unit 3 which is connected via bus 5 to the memory 1 and via bus 6 to the register file 2. The instruction control unit is responsible for executing instructions stored in a program sequence in memory 1. Therefore, instruction control unit comprises a program counter register 3a and a program status word register 3b. For managing task switching, instruction control unit 3 comprises a contact switch control unit 3c.

The context switch control unit 3c is responsible for saving the contents of all necessary registers associated to a task which build the context of a task. A data processing unit according to the invention saves the context of a task automatically without any additional instructions provided by respective software program. As the context switch control unit 3c is part of the instruction control unit 3, the respective instructions or events are checked by the context control unit 3c. In case of a call instruction, an exception such as an external interrupt or a trap, or a system call instruction, the context switch control unit 3c automatically stores the context into a memory field, the so-called context save areas. The management of a plurality of context save areas is handled by the specific task switching registers 2d, 2e and 2f provided in the system register file.

As mentioned before, associated with any task is a set of state elements known collectively as the task context. The context is everything the processor needs in order to define the state of the associated task and enable its continued execution. It includes the central processing unit general registers that the task uses, the task current program counter, and its program status word. Technically, the context also includes the contents of task memory space and various special function registers that can effect its execution, for example, the memory protection registers, etc. In this embodiment, however, the term will be used in a more restricted sense to refer only to the state that must be immediately saved when a task is interrupted or suspended, and restored before its execution is resumed. Task memory space does not usually need to be saved because it is typically left untouched while the task is suspended, and not reassigned to another task.

On an interrupt, the processor suspends the execution of the current task by saving its context in memory before starting execution of the interrupt handler. Later, the saved context can be reloaded to resume execution of the interrupted task.

When a function call is made, the calling routine also has context that must be saved and then restored in order to resume the caller's execution after return from the function. The principal difference is that interrupts occur asynchronously, so that the context saved must include all registers that the interrupted task might be using, while calls are synchronous. The calling function knows when it is about to make a call, so calling and called functions can cooperate to minimize the amount of context that must be saved and restored. This is done by petitioning the general registers into subsets: those whose contents will be preserved across the call, namely non-volatile registers, and those whose contents will not be preserved, namely scratch registers. The caller is responsible for preserving any of its context that resides in scratch registers before the call, while the called function is responsible for preserving the callers values in any non-volatile registers that the called function uses. The calling function preserves its scratch register context, when necessary, either by saving the registers in memory, or copying them to non-volatile registers. But the compiler register allocator tries to minimize the need for either action by tracking what data items are live across a call, defined before the call and used after it, and allocating those items to non-volatile registers. Likewise, the compiler tries to minimize the amount of context saving and restoring in the called function by minimizing the number of non-volatile registers that it uses.

What a data processing unit according to the present invention brings to this picture is the ability to save and restore context more quickly than conventional microprocessors and microcontrollers. It does so using a wide bus to align blocks of on-chip memory. Bus 4a and bus 4b each are as wide as for example at least two or more registers. Therefore, as shown in FIG. 1, for example four registers, an even and an odd data register and an even and an odd address register can be accessed in parallel. This is done by grouping data registers and address registers each into a group of odd and even registers. The main feature is that the saving of the non-volatile registers is integrated with the call-instruction so it happens in parallel with the call jump. Likewise the restoring of the registers is integrated with the return instruction and happens in parallel with the return jump. The called function need not concern itself with saving and restoring the callers context, and it is freed of any need to minimize the number of non-volatile registers that it uses.

On an interrupt, it is handled in the same way a call-instruction is handled. Another feature of the present invention is that each context is divided into two portions of context which are referred to as the upper context and the lower context. Upper and lower context can have preferably the same size, but if necessary can also have different sizes. The linked list mechanism provides the convenience that every context save area can have a different size if necessary. The content of the upper context is shown in FIG. 5 by numeral 8, and the content of the lower context is shown in FIG. 5 by numeral 9. The upper context 8 consists of the upper address registers A10–A15 and the upper data registers D8–D15. These are the registers that are designated as non-volatile, for purposes of function calling. The upper context also includes the processor status word PSW. The lower context 9 consists of the lower address registers A2–A7 and the lower data registers D0–D7, plus the interrupt program counter value. Both upper and lower context 8, 9 include a link word. In the upper context, however, the link is embedded in PCXI. Registers A0–A1 in the lower address registers and A8–A9 in the upper address registers are defined as system global registers. They are not included in either context partition, and are not saved and restored across calls or interrupts. They are normally used by the operating system to reduce system overhead, and can be optionally write protected against unintended modification by application tasks. If a call or an interrupt is executed, only the upper context is automatically stored in memory 1. However, the lower context can be stored by a special instruction causing the allocation of respective memory and storing the contents of the lower context as will be explained in more detail below. For small interrupt handlers or call instruction handlers that can execute entirely within the set of registers saved on the interrupt, no further context saving is needed. The respective handler can execute immediately and return, leaving the unsaved portions of the interrupted task context untouched. For interrupt handlers that make calls, only one additional instruction is needed to save the registers that were not saved as part of the interrupt sequence.

As the lower context normally is not stored upon a call or exception, the associated registers of the lower context can be used to pass arguments to a called function. Likewise, since they are not automatically restored as part of a return-sequence, they can be used to pass return values from called functions back to their callers.

FIG. 6 shows a sequential execution model in order to understand the exception and interrupt handling of a data processing unit according to the present invention. The fundamental execution model is a fundamental execution model of a sequential flow of execution. Each instruction is individually fetched in step 60, decoded in step 62, and executed in step 64. If an instruction causes an exception, this is checked in steps 61, 63 and 65. Then, none of the side effects or updates from a following instruction are seen in the machine. This is very important since it significantly simplifies the exception handling model. In step 66, the state of the program counter, general purpose registers and the memory are updated and in step 68, it is checked whether an interrupt is pending. Steps 67 and 69 set the respective trap or interrupt handlers.

A data processing unit according to the present invention employs linked lists of fixed size context save areas (CSAs). FIG. 2 shows how these CSAs are organized in memory 1. The contents of PCX-register 2e points at an address where a context save area CSA2 begins. A context save area can have two portions whereby the first portion contains the actual context and a second portion 1b includes a pointer to another context save area, context save area CSA1 in FIG. 2. The FCX-register 2d points to the first of a list of unused context save areas CSA3, CSA4, and CSA5. Each context save area CSA3, CSA4, and CSA5 comprises a link word 1c, 1d and 1e which contains the address of the following CSA. Therefore, the FCX register contains the starting address of CSA3, linking word 1c contains the address of CSA4, and linking word 1d contains the starting address of CSA5. The system register file contains also a comparator 2g which compares the contents of FCX-register 2d and FCXLMT-register 2f. If the contents of both register 2d and 2f are equal, a signal is sent to terminal 7.

A CSA is, for example, 16 words of on-chip memory storage, aligned on a 16-word boundary. A single CSA can hold exactly one upper or one lower context 8, 9 as shown in FIG. 5. As shown in FIGS. 8 and 9, the starting word of each upper and lower context save areas 8, 9 start with the link word or PCXI. This represents the data portion 1a, 1b, 1c, 1d and 1e of FIG. 2. In FIG. 2, unused context save areas, CSA3, CSA4, CSA5 are linked together on a free list. Context switch register 2d points at the first context save areas CSA3 of the linked list. They are allocated from the free list as needed, and returned to it when no longer needed. The allocation and freeing are done by the processor hardware and are transparent to applications code. Only the system start-up code and certain operating systems exception handling routines ever need to access the CSA lists on memory storage explicitly.

The context save areas CSA2 and CSA1 are linked together as a list of used context save areas. Context switch register 2e always points to the actual context switch area, which is in the case of FIG. 2 context save area CSA2.

As mentioned before, the FCX-register 2d always points to an available CSA, where the upper context can be automatically saved in the event of a call or interrupt, or the lower context can be saved in the event of a special instruction. Just before a context is saved in that area, however, the link word is read from it, supplying a new value for FCX. To the memory subsystem, context switching is therefore a read-modify-write operation. The new value of FCX is immediately available for subsequent calls or interrupts or for explicit saving of the lower context.

The FCXLMT-register 2f is used to recognize impending CSA list underflow. If the value of FCX is used on an interrupt or call matches the limit value, the context safe operation completes but comparator 2g generates the trap signal that forces the target address to the trap vector address for CSA list depletion. Th action taken by the trap handler depends on system design; it might issue a system reset, if it is determined that the CSA list depletion resulted from an unrecoverable software error. Normally, however, it will extend the free list either by allocating additional memory, or by terminating one or more tasks and reclaiming their CSA call chains. In those cases, the trap handler will exit with a return from exception-instruction, and the original interrupt will then be taken, or the call instruction read-executed.

The PCX field in the PCXI.PCX-register points to the CSA for the previous context, for example, the context that will be restored when a respective return instruction is executed. It is the list head pointer for a linked list of saved contexts. The saved context it points to could be an upper context or a lower context, depending on whether the preceding context save operation was for a call, interrupt or trap, or for the save context-instruction operation.

The following example shows a context save operation. In this simple example, the free context list contains three free CSAs, namely CSA3, CSA4, and CSA5, and the previous context list contains two CSAs, namely CSA2 and CSA1, as shown in FIG. 2. When the context save operation is performed, the first context save area in the free context list CSA3 is pulled off and placed on the front of the previous context list. This movement from the free to the previous context list involves the updating of the PCX-register 2e and the FCX-register 2d and the link word of the context save areas being transferred in the following way, as shown in FIG. 3. An additional help register might be used if necessary to complete this procedure. The help register will be loaded with the content of the link word 1c of CSA3, the link word of CSA3 1c is loaded with the content of TCX register 2e; the PCX-register 2e is loaded with the content of FCX-register 2d; and the FCX-register is loaded with the content of the help register.

The context and context switch registers now look like the diagram shown in FIG. 4. The processor context to be saved can now be written into the rest of the CSA3 which has been transferred to the front of the previous context list.

To restore a context save area, the processor context to be restored is read from the CSA at the front of the previous context list, in this case from CSA3. The CSA is now transferred from the previous context list to the front of the free context list. This movement from the previous to the free context list involves the updating of the PCX-register 2e and the FCX-register 2d and the link word of the context save area being transferred in the following way. The help register is loaded with the link word 1c of CSA3; the link word 1c of CSA3 is loaded with the content of FCX-register 2d; FCX-register 2d is loaded with the content of PCX-register 2e; and PCX-register 2e is loaded with the content of the help register. The context and the context switch registers now look like the diagram shown FIG. 2. In addition to the automatic save and restore function executed by the context switch control unit 3c, a data processing unit according to the present invention can initiate the same procedure for saving an upper or lower context by a special instruction. For example, a save lower context instruction can initiate the same procedure as a call-instruction or an exception. In addition, a so-called store context-instruction can store either the lower or upper context without changing the list of used context save areas or unused context save areas. A restore lower context effects the same as a return-instruction whereas a load context-instruction loads either the lower or upper context from the actual context save area without changing the list of used and unused context save area.

What is claimed is:

1. Method of context switching from a first task to a second task in a data processing unit having a register file with a plurality of general purpose registers and a context switch register, a memory comprising a previous context save area and an unused context save area, said memory being coupled with the register file and an instruction control unit having a program counter register and a program status word register coupled with the memory and the register file, wherein each context save area has a first portion containing the context and a second portion containing a link word, and wherein said context switch register stores the address of the previous context save area associated to said first task, comprising the steps of:

acquiring a new save area from said unused save area, storing the content of said context switch register in said second portion of the unused context save area thereby linking the actual and the unused context save areas to first and second context save areas, storing the address of said unused context save area in said context switch register, storing the context of said first task in said first portion of said unused context save area.

2. Method of context switching from a first task to a second task in a data processing unit having a register file with a plurality of general purpose registers and a context switch register, a memory comprising a previous context save area and an unused context save area, said memory being coupled with the register file and an instruction control unit having a program counter register and a program status word register coupled with the memory and the register file, wherein each context save area has a first portion containing the context and a second portion containing a link word, and wherein said context switch register stores the address of the previous context save area associated to said first task, comprising the steps of:

assigning a new context save area from a list of unused context areas by:

storing the content of said second portion of the first unused context save area of said linking list in said second context switch register, and storing the content of said second context switch register in said first context switch register, and storing the content of said first context switch register in the second portion of said first unused context save area, storing the context in said first portion of said new assigned context save area.

3. Method according to claim 1, for switching back to said first task further comprising the steps of:

storing the content of said second portion of said second context save area in said context switch register, and restoring the context stored in said first portion of said first context save area.

4. Method according to claim 2, for switching back to said first task further comprising the steps of:

storing the content of said second portion of the actual context save area in said first context switch register, and storing the content of said first context switch register in said second context switch register, and storing the content of said second context switch register in the second portion of said actual context save area, and restoring the context stored in said first portion of the context save area which is indicated by said first context switch register.

5. Method according to claim 1, wherein said context switch is performed upon an instruction.

6. Method according to claim 1, wherein said context switch is performed upon an exception.

7. Method according to claim 5, wherein said context comprises the content of a predefined number of general purpose registers, the content of said program counter register, and the content of said program status word register.

8. Method according to claim 6, wherein said context comprises the content of a predefined number of general purpose registers, the content of said program counter register, and the content of said program status word register.

9. Method according to claim 7, wherein the content of a plurality of said registers is stored in parallel in said context save area.

10. Method according to claim 2, wherein each context is divided into at least an upper and a lower context, both having the same size (not essential) and said upper context is stored by said task switch and the lower context is storeable by an instruction triggering an additional task switch.

11. Method according to claim 2, wherein said context switch is performed upon an instruction.

12. Method according to claim 2, wherein said context switch is performed upon an exception.

13. Method according to claim 11, wherein said context comprises the content of a predefined number of general purpose registers, the content of said program counter register, and the content of said program status word.

14. Method according to claim 12, wherein said context comprises the content of a predefined number of general purpose registers, the content of said program counter register, and the content of said program status word.

15. Method according to claim 13, wherein the content of a plurality of said registers is stored in parallel in said context save area.

16. Method according to claim 2, wherein each context is divided into at least an upper and a lower context, both having the same size and said upper context is stored by said task switch and the lower context is storeable by an instruction triggering an additional task switch.

17. Method according to claim 2, wherein the register file further comprises a third context switch register storing the address of a defineable unused context save area in the link list, further comprising the steps:

comparing the content of the second register the content of the third register, and if both registers are equal generating an exception.

18. Data processing unit having a register file comprising a plurality of general purpose registers and a context switch register, a having an actual context save area and an unused context save area coupled with the register file and an instruction control unit comprising a program counter register and a program status register coupled with the memory and the register file, wherein each context save area comprises a first portion containing the context and a second portion containing a link word, and wherein said context switch register stores the address of a first context save area associated to said first task, wherein the instruction control unit comprises a context switch control unit comprises:

means for storing the context in said first portion of said first context save area, means for storing the content of said context switch register in said second portion of a second context save area thereby linking first and second context save areas, and means for storing the address of said second context save area in said context switch register.

19. Data processing unit having a register file comprising a plurality of general purpose registers and a first and second context switch register, a memory having an actual context save area and a plurality of unused context save areas, said memory being coupled with the register file and an instruction control unit comprising a program counter register and a program status register coupled with the memory and the register file, wherein each context save area comprises a first portion containing the context and a second portion containing a link word, whereby said unused context areas being linked to an unused context list by means of said second portions and wherein said first context switch register stores the address of the actual context save area associated to said first task, and said second context switch register stores the address of the first of said context save areas of said unused context list, wherein the instruction control unit comprises a context switch control unit comprises:

means for storing the context in said first portion of said actual context save area, and means for storing the content of said second portion of the first unused context save area of said linking list in said second context switch register, and for storing the content of said second context switch register in said first context switch register, and for storing the content of said first context switch register in the second portion of said first unused context save area.

20. Data processing unit according to claim 19, further comprising a third context switch register for storing the address of a defineable unused context save area in the link list, and a comparator coupled with said second and third context switch registers which generates an exception if the contents of both registers are equal.

21. Data processing unit according to claim 18, wherein said general purpose registers in said register file are organized in a plurality of groups, said groups being accessable in parallel.

22. Data processing unit according to claim 19, wherein said general purpose registers in said register file are organized in a plurality of groups, said groups being accessable in parallel.

23. Data processing unit according to claim 21, wherein said general purpose register are divided into a first group of address registers and a second group of data registers.

24. Data processing unit according to claim 23, wherein said first and second group are each divided into groups of odd and even registers which are accessible in parallel.

* * * * *